United States Patent [19]

White, III

[11] 4,412,382

[45] Nov. 1, 1983

[54] LINE FEED MECHANISM FOR FILAMENT CUTTING

[75] Inventor: Donald M. White, III, Chanhassen, Minn.

[73] Assignee: The Toro Company, Minneapolis, Minn.

[21] Appl. No.: 260,450

[22] Filed: May 4, 1981

[51] Int. Cl.³ .............................................. B26D 1/12
[52] U.S. Cl. ...................................... 30/276; 56/12.7
[58] Field of Search .................... 30/276, 347; 56/12.7

[56] References Cited

U.S. PATENT DOCUMENTS

| | | | |
|---|---|---|---|
| 4,151,646 | 5/1979 | Lane | 30/276 |
| 4,189,833 | 2/1980 | Kwater | 30/276 |
| 4,274,201 | 6/1981 | Oberg et al. | 30/276 |

Primary Examiner—James M. Meister
Assistant Examiner—Douglas D. Watts
Attorney, Agent, or Firm—James W. Miller

[57] ABSTRACT

An indexing mechanism (10) for a filament line vegetation cutting device (12) comprises a spool (34) fixed to a drive shaft (22). Enclosure (62) surrounds spool (34) and has a grommet (82) for guiding a filament line (2) contained on spool (34). A spider (64) has upstanding members (68) and is contained in enclosure (62) for rotation therewith. Upstanding members (68) are selectively engaged with teeth (54) on spool (34) for driving enclosure (62) synchronously with spool (34). Members (68) disengage teeth (54) to allow a line indexing action to occur by virtue of radially inward movement of members (68) in response to bumping enclosure (62) on the ground.

5 Claims, 5 Drawing Figures

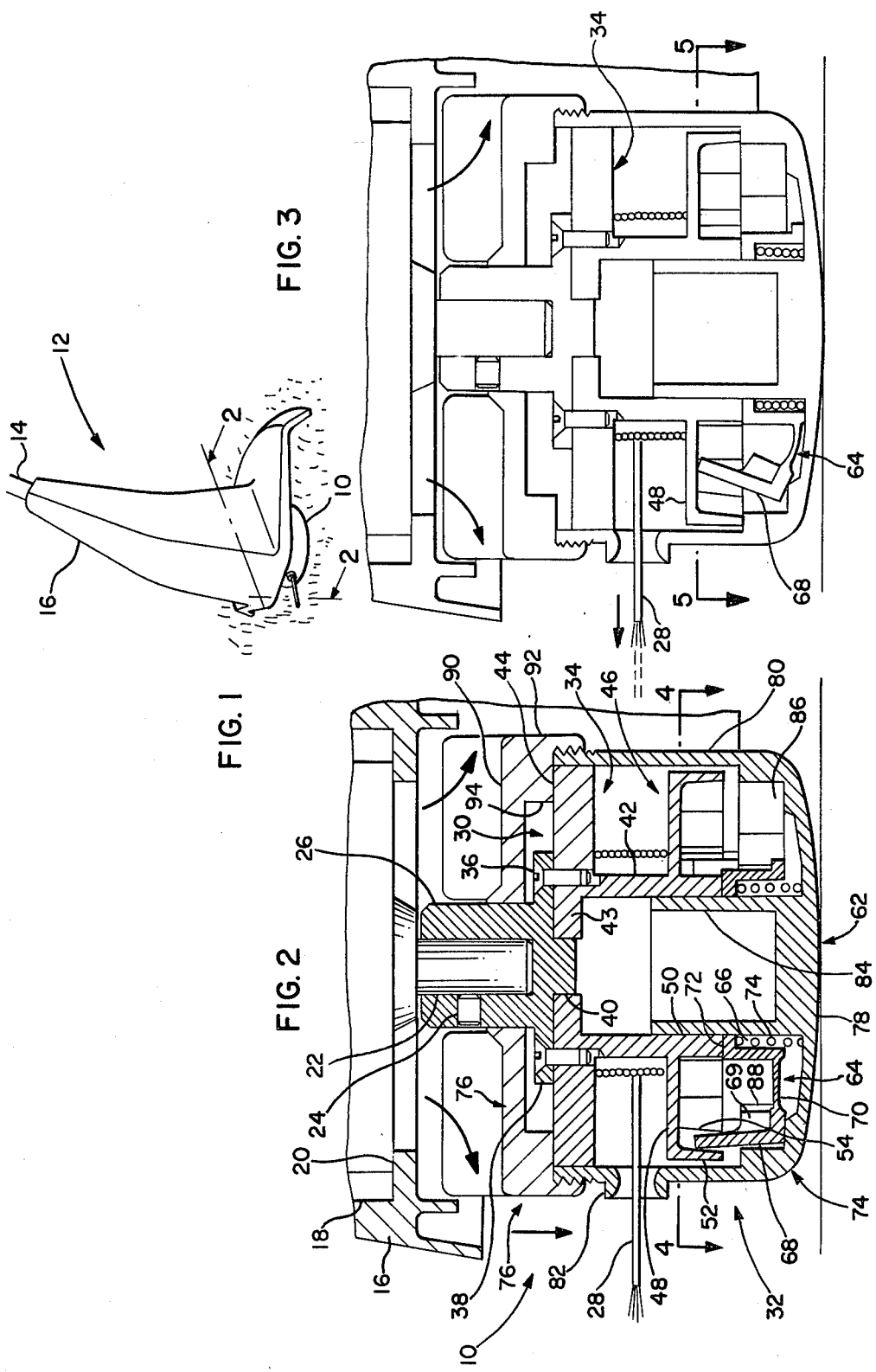

LINE FEED MECHANISM FOR FILAMENT CUTTING

FIELD OF THE INVENTION

This invention relates to the field of filament cutting devices and, more particularly, to a line feed mechanism which meters a discrete length of flexible filament from a spool member in such a device when the mechanism is bumped against the ground.

BACKGROUND OF THE INVENTION

Filament cutting devices have generally taken the form of a power source connected to a shaft which holds a whirling or rotating filament holding head or housing. Within the head or housing is at least one flexible filament that extends exteriorly of the housing. The head or housing is rotated at a speed sufficient to create line rigidity. The whirling filament is employed to cut grass or weeds. As a result of normal usage, the flexible filament often becomes worn, frayed or broken. The effective cutting length of the filament is thereby shortened. It is necessary, therefore, to provide within the filament cutting device a line feed mechanism for uncoiling, paying out or otherwise providing a new cutting length of flexible filament. To avoid overloading the power source and also to conserve flexible filament, it is desirable to have a mechanism which permits the paying out of the filament in predetermined discrete increments only.

Devices are known in the prior art for feeding out a metered length of flexible filament. Some of these require the filament cutting device to be stopped to disengage a locking mechanism to unlatch a filament spool for rotation relative to a filament guide means. With the spool free to rotate, the free end portion of the filament is lengthened by manually pulling it from the spool. These manually-operated devices obviously are not very convenient and usually are quite time-consuming to operate.

Other filament cutting devices need not be stopped while feeding filament. Some of these other cutting devices have line indexing structure remotely operable from the operator's handle. For example, U.S. Pat. No. 4,134,204 shows a remotely operable indexing structure comprised of two sets of axially-displaced and rotationally-offset teeth. A rod extending radially relative to the drive shaft axis and attached to a driving means engages a tooth from one set to drive the spool synchronously with a guide housing. To feed additional filament, the operator remotely causes the rod to move axially, thereby disengaging the rod from the first set of teeth and engaging the second set. The rod when subsequently released by the operator again moves axially to disengage from the second set of teeth and reengage the first set. During this sequence, the rod advances from a driving engagement with one tooth in the first set to a consecutive tooth in rotationally relative to the spool and to feed a discrete amount of filament from the spool. Although remote control structure may be advantageous at times, it makes the device more complex and can be troublesome to maintain.

There are filament cutting devices which utilize the principle of rotational momentum during the deceleration or stopping of the cutting device to advance the spool portion of the device relative to the filament guide means portion. One such device is disclosed U.S. Pat. No. 4,245,454, which is assigned to the assignee of this invention. The line metering device disclosed therein includes a driving mechanism and a driven mechanism. A first set of teeth with ramp elements therebetween is formed on the top of a spool which is preferably coupled directly to the driving mechanism. A second set of teeth for engagement with the first set of teeth is formed on an under surface of a guide drum which is coupled to the driven means and disposed in an overlying relationship with the filament spool. A bias means forces the second set of teeth on the guide drum into driving engagement with the first set of teeth on the filament spool. When the driving means is rapidly braked by a suitable decelerating means, the rotational momentum of the guide drum overcomes the bias force holding the first and second sets of teeth in an engaging relationship and allows the second set of teeth to slide up the ramp means and rotatively move the guide drum relative to the filament spool. The relative rotation of the guide drum and the filament spool results in a lengthening of the swinging portion of the filament. Such a line metering apparatus utilizing the principle of rotational momentum is especially useful on wheeled cutting devices.

Additionally, there are filament cutting devices which have feeding mechanisms operated by bumping the cutting devices on the ground. Such a device is disclosed in the patent application of Henry B. Tillotson entitled "Line Metering Apparatus", filed Aug. 13, 1976, under Ser. No. 714,013 and assigned to the assignee of this invention. The cutting device disclosed in Tillotson has a drive shaft which carries a drive gear having teeth projecting radially outward. A filament spool carries a driven gear having first and second sets of gear teeth which project radially inward for selective engagement with the drive gear teeth. The two sets of driven gear teeth are spaced axially from each other and rotationally staggered a predetermined angular distance. The filament spool is normally axially biased so the drive gear teeth engage the upper set of driven gear teeth. When the free filament end becomes worn or broken, additional filament is fed by tapping the lower surface of the spool on the ground thereby moving the spool axially upward against the bias of the spring until the drive gear teeth move out of engagement with the upper set of driven gear teeth and into engagement with the lower set of driven gear teeth. As this happens, the staggered relation of the driven gear teeth causes limited relative rotational movement of the spool relative to the drive shaft causing a predetermined length of filament to unwind. As the tapping force is removed, the spool returns to its original axial location thereby allowing an additional length of filament to unwind in the same manner.

Tillotson discloses the advantageous means of bumping a feeding mechanism on the ground to feed a discrete amount of filament. Tillotson utilizes the axial movement of drive teeth. The present invention discloses new and unobvious means of feeding line by bumping the feeding mechanism on the ground without such axial movement.

SUMMARY OF THE INVENTION

The present invention is directed to an apparatus for feeding out discrete lengths of filament in a vegetation cutting device in which a free end of the flexible filament is rotatively swung as a cutting length about the axis of a drive shaft. The apparatus includes a driving means having at least one driving member for rotatively driving the flexible filament about an axis. A driven means having at least one driven member for selective engagement with the driving member is selectively rotated with the driving means. Spool means for storing the flexible filament is coupled to one of the driven and driving means for rotation therewith. Means for metering discrete lengths of filament from the spool means by bumping the driven means on the ground is provided. The metering means includes means for moving one of the driving and driven members radially with respect to the drive shaft axis during the bumping operation whereby the driven and driving means disengage and index causing the spool means to pay out a length of filament.

BRIEF DESCRIPTION OF THE DRAWINGS

The invention will be described in more detail hereafter, when taken in conjunction with the following drawings.

FIG. 1 is a perspective view of a filament cutting device;

FIG. 2 is a cross-sectional view showing a line feed mechanism in accordance with the present invention;

FIG. 3 is a cross-sectional view, similar to FIG. 2, showing the line feed mechanism of FIG. 2 with a force applied to the bottom thereof;

DESCRIPTION OF THE PREFERRED EMBODIMENT

Figure 4:
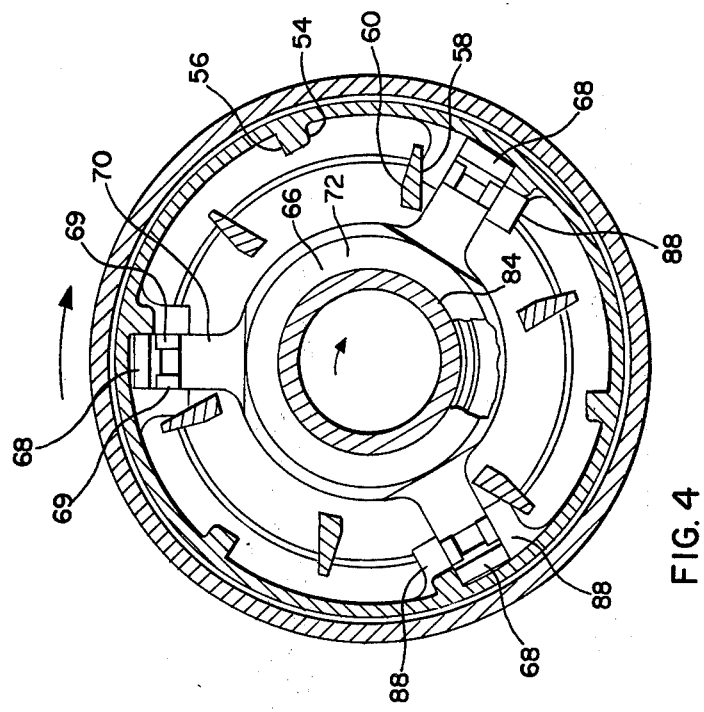
FIG. 4 is a top plan view, taken along lines 4—4 of FIG. 2, showing the spider relative to the drive teeth.

Referring now to the drawings, wherein like reference numerals designate identical or corresponding elements throughout the several views. Referring first to FIG. 2, a line feed mechanism in accordance with the present invention designated generally as 10. The line feed mechanism 10 may be used on a flexible filament vegetation cutting device 12 as illustrated in FIG. 1. The cutting device 12 in FIGS. 1 and 2 includes a shaft 14 and a shroud 16 to which a motor 18 is attached along shroud flange 20 in a convential way (not shown). Line feed mechanism 10 is attached to the drive shaft 22 of motor 18 by tightening set screw 24 in coupling 26. Set screw 24 bears against drive shaft 22. Line feed mechanism 10 is seen in FIG. 1 projecting below shroud 16. A flexible filament 28 extends out rigidly from line feed mechanism 10 in a vegetation cutting configuration when mechanism 10 is rotating.

Line feed mechanism 10 comprises a driving portion 30 and a driven portion 32. The driven portion 32 is selectively coupled, in a manner to be described hereinafter, to the driving portion 30 for rotation therewith.

In the embodiment shown in FIG. 2, the driving portion 30 comprises coupling 26 and spool 34 fastened to coupling 26 by a plurality of screws 36. Coupling 26 is cylindrical with a circular flange 38 at its lower end. Coupling 26 has a centered, cylindrical cavity for the insertion of shaft 22 of motor 18. A threaded opening in the wall of coupling 26 accepts set screw 24. Screws 36 pass through equiangularly spaced openings in flange 38. A cylindrical knob 40 extends below the flange 38 for the purpose of centering spool 34 with respect to coupling 26 during attachment of one to the other. The knob 40 is cylindrical and has a diameter approximately the same as the cylindrical cavity at the opposite end of coupling 26. Alternatively, coupling 26 could be integrally formed with driving portion 30 eliminating the need for screws 36, knob 40, etc.

Spool 34 comprises a central core 42 with upper and lower flanges 44 and 46, respectively, defining therebetween a filament receiving region. Filament 28 is wound in this region in the direction of rotation of shaft 22, e.g. with shaft 22 rotating counterclockwise filament 28 will be wound in a counterclockwise direction. Central core 42 is cylindrically hollow and has a top cover 43 integral with upper flange 44. Cover 43 has a centered opening for the insertion of knob 40 of coupling 26. The diameter of the hollow portion of central core 42 is slightly greater than the outer diameter of a centering tube 84 of enclosure 62, to be described hereinafter. Central core 42 has a lower surface for a slideable contact, similar to that of a thrust bearing, with the central core 66 of spider 64, to be described hereinafter. Lower flange 46 has sufficient thickness to include a formed portion below an upper wall 48 of flange 46 and between inner and outer sides 50 and 52, respectively. A plurality of equiangularly spaced driving members or teeth 54 extend downwardly from upper wall 48 adjacent outer wall 52. As seen in FIG. 4, each tooth 54 has an abutment surface 56 facing in the rotating direction of drive shaft 22 and parallel to the forward edge of an upstanding member 68 of spider 64, to be described hereinafter, when the forward edge of the upstanding member 68 is in contact with the abutment surface 56. Teeth 54 have sufficient thickness to withstand a large number of impacts by upstanding members 68 without cracking or otherwise failing.

A plurality of stop members 58 also extend downwardly from upper wall 48 of flange 46. The centerline of stop members 58 is located along a circle of smaller diameter than a circle representing the centerline of teeth 54. The number of stop members 58 is equal to the number of teeth 54. Stop members 58 are rotatively offset from teeth 54 so that a stop member 58 lies approximately between two consecutive teeth 54, although inwardly from teeth 54 (see FIG. 5). The outer edge of each stop member 58 is sufficiently spaced from outer side 52 of lower flange 46 so that the upstanding members 68 of spider 64 can pass between them without touching either. Stop members 58 have an abutment surface 60 facing in the rotating direction of drive shaft 22. Abutment surface 60 is angled relative to the forward edge of an upstanding member 68 to form a ramp surface that contacts member 68 for a purpose described hereafter. Stop members 58 have sufficient thickness to withstand repeated impact by upstanding members 68 without cracking or otherwise failing. Both teeth 54 and stop members 58 extend downward sufficiently far to contact upstanding members 68 of spider 64.

The driven portion 32 of line feed mechanism 10 is comprised of a housing or enclosure 62 and a spider 64 retained within enclosure 62. Driving teeth 54 engage the upstanding members 68 of spider 64 to drive driven portion 32 synchronously with driving portion 30.

Spider 64 comprises a central core 66, a plurality of upstanding members 68, and a plurality of arms 70 for attaching each upstanding member 68 to central core 66. The central core 66 of spider 64 is a cylindrical tube having a circular, inwardly-extending flange 72 at its top. Flange 72 defines an upper surface for slideable contact with the lower surface of central core 42 of spool 34. A central opening in flange 72 has a diameter slightly larger than the diameter of centering tube 84 of enclosure 62 so that spider 64 can be received on tube 84. The inner diameter of central core 66 is sufficiently larger than the diameter of the opening in flange 72 to accomodate a coil spring 74. Spring 74 is encircled about centering tube 84 and bears against flange 72 to force core 66 of spider 64 into contact with core 42 of spool 34.

Upstanding members 68 are essentially L-shaped having sufficient width and thickness to withstand a large number of impacts with the driving teeth 54 and the stop members 58. One or two squarely-shaped, or other shape, plate-like brace members 69 extend from the shorter portion of the L-shaped upstanding members 68 to the longer portion to provide added strength for the upstanding members 68.

A flat arm 70 extends between each upstanding member 68 and the central core 66 of spider 64. Arm 70 extends between the shorter portion of the L-shaped upstanding member 68 and the lower end of the outer side of central core 66. The arms 70 are flat and have a width approximately equal to that of upstanding members 68 though they could be shaped differently. Arms 70 have thickness sufficient to provide the strength and rigidity to support upstanding members 68 and central core 66 relative to one another. At the same time, however, arms 70 are sufficiently thin to function as leaf springs. In other words, arms 70 normally bias members 68 into their FIG. 2 configuration, but they also allow upstanding members 68 to bend radially inward when an upward force is applied to enclosure 62 as shown in FIG. 3. In addition, the mass of upstanding members 68 is selected so that centrifugal force acting on the members also helps bias members 68 into their FIG. 2 configuration.

Figure 5:
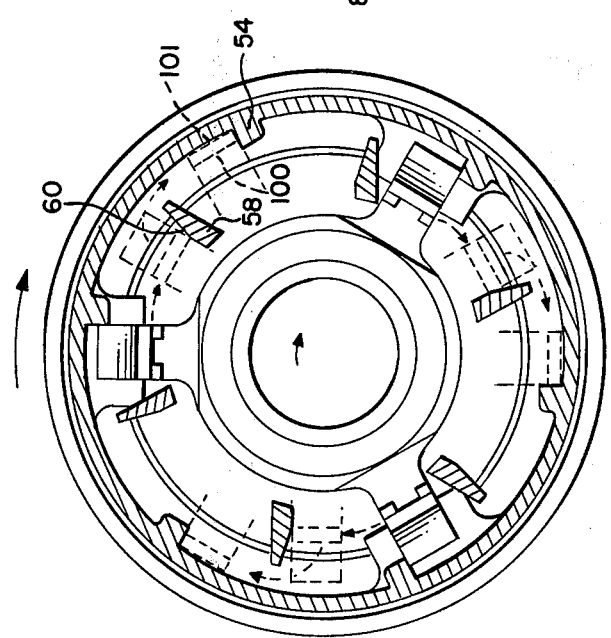
FIG. 5 is a top plan view, taken along lines 5—5 of FIG. 3, illustrating the various positions of the spider relative to the drive teeth and the stop members during a ground bump cycle.

The upstanding members 68 and the arms 70 are equiangularly spaced about central core 66. There are half as many upstanding members 68 and arms 70 as driving teeth 54 and stop members 58 in the embodiment shown in the drawings. However, different numbers of members 68, teeth 54 and stop members 58 could be provided. The upstanding members 68 have inner and outer surfaces 100 and 101 perpendicular to and between the upper and lower horizontal radial planes between which the teeth 54 and the stop members 58 lie. Referring to FIGS. 4 and 5, the upstanding members 68 normally engage teeth 54 in a driving engagement and are located radially outside stop members 58 to avoid contact with them.

Enclosure 62 comprises a cup 74 and a top 76. Cup 74 has a circular, convex bottom 78 with a cylindrical side wall 80 rising therefrom. The upper, outer edge of side wall 80 is threaded to match inner threads in top 76. There is an opening in side wall 80 approximately centered between upper and lower flanges 44 and 46 of spool 34 for the insertion and attachment of grommet 82. Grommet 82 supports and guides filament 28 outwardly from spool 34.

Cup 74 includes a centering tube 84 for centering enclosure 62 with respect to spool 34. Centering tube 84 is centered on the inner surface of bottom 78 and extends upwardly to a location somewhat above the lower flange 44 of spool 34. The outer diameter of the central tube 84 is slightly less than the inner diameter of the central core 42 of spool 30. The central core 66 of spider 64 and spring 74 also encircle centering tube 84 with spring 74 compressively forcing central core 66 of spider 64 against the lower surface of central core 42 of spool 34. A ring 86 is integrally formed along the inner surface of bottom 78 to support upstanding members 68 and, thereby, to support the central core 66 of spider 64 spaced above bottom 78. While a ring 86 has been shown, any suitable support means, e.g., spaced bands, could be used to support spider 64.

As shown in FIG. 4 a plurality of pairs of retaining walls 88 are formed at the junction of bottom 78 and side wall 80 of enclosure 62. Retaining walls 88 fit closely along the sides of uptstanding members 68 to retain them as they engage either driving teeth 54 or stop members 58. When spider 64 is made from a flexible material, like delrin, retaining walls 88 also provide support for upstanding members 68. The two retaining walls 88 forming a pair are separated by a distance slightly greater than the width of the upstanding members 68 to receive the members 68 therebetween. The pairs of retaining walls 88 are equal in number to upstanding members 68 and are circumferentially spaced apart in a fashion similar to upstanding members 68 in spider 64. Retaining walls 88 extend approximately half the way up the sides of upstanding members 68.

Top 76 of enclosure 62 is circular with a downwardly extending flange 92. Flange 92 has threads along its inner surface. As described above. An integral ring 94 is formed at the intersection of flange 92 and top surface 90. The lower surface of ring 94 rests on the upper surface of upper flange 44 of spool 42 and, consequently, supports enclosure 62 on spool 42. A plurality of fan blades 96 are spaced apart equiangularly on upper surface 90. The rotation of line feed mechanism 10 rotates fan blades 96 to cause cooling air to be drawn through motor 18. Fan blades 96 also create an outward air flow from line feed mechanism 10 to blow the various grass clippings away from cutting device 12.

Side wall 80 of enclosure 62 has sufficient length so that when enclosure 62 is supported by ring 94 on upper flange 44, ring 86 at the bottom of enclosure 62 supports upstanding members 68 for operational engagement with driving teeth 54 and stop members 60.

In operation, motor 18 rotates line feed mechanism 10. Spool 34 is directly coupled to motor 18 and, consequently, rotates at the same speed as motor 18. Housing enclosure 62 is selectively coupled to spool 34. The coupling of enclosure 62 with spool 34 is accomplished through spider 64. As spool 34 rotates, driving teeth 54 extending from lower flange 46 of spool 34 push against the upper portion of upstanding members 68 of spider 64. Since spider 64 is retained in cup 74 of enclosure 62 by retaining walls 88, enclosure 62 rotates synchronously with spool 34. The cutting length of filament 28 in turn is supported and guided outwardly from spool 34 by grommet 82 in enclosure 62. The cutting length of filament 28 assumes rigidity as it is rotated and functions as a cutting element to shear grass or other ground growing vegetation.

When the cutting length of filament 28 becomes worn or frayed so that additional filament is required, cutting device 12 is bumped against the ground to apply an upward force to bottom 76 of cup 74. Central core 66 of spider 64 is axially retained against central core 42 of spool 34 while upstanding members 68 are forced axially upward by ring 86. This causes members 68 to move from a first orientation in which they are in driving engagement with teeth 54 to a second orientation in which they are in engagement with some of the stop members 58. In other words, upstanding members 68 are pulled and pivoted inwardly as arms 70 of spider 64 bend. Upstanding members 68 move radially inward to disengage from teeth 54 allowing housing 62 to slow rotationally relative to spool 34. Spool 34 advances relative to housing 62 until stop members 58 impact upstanding members 68 which again causes spool 34 and enclosure 62 to rotate synchronously. When the force on bottom 76 of enclosure 62 is removed, as by lifting housing 62 up off the ground, compressed spring 74 forces enclosure 62 axially downward to its original position. Arms 70 of spider 64 and centrifugal force on members 68 then bias upstanding members 68 back radially outward to their first orientation. This movement is facilitated by the angled abutment surface 60 on stop members 58 which forms a ramp on which members 68 will not catch and helps cam members 68 outwardly. Thus, upstanding members 68 disengage stop members 58 and allow spool 34 to advance again a discrete rotational distance relative to enclosure 62. Thus, for each bump on the ground, upstanding members 68 move from driving engagement with one tooth 54 to the next consecutive tooth 54 in a direction opposite to that of the normal direction of rotation of spool 34 as shown by the clockwise dotted line arrows see FIG. 5. Since filament 28 is wound in the same direction on spool 34 as spool 34 rotates, this reverse rotation of housing 62 relative to spool 34 causes a discrete length of filament 28 to unwind from spool 34 and advance out a discrete amount relative to grommet 82 in enclosure 62.

Line feed mechanism 10 according to this invention has numerous advandages. One primary advantage relates to the fact that the upstanding members 68 engage and disengage from the teeth 54 and the stop members 58 by virtue of radial movement and not axial movement. Moreover, upstanding members 68 are contained on a spider 64 which is releasably contained in enclosure 62. Thus, if upstanding members 68 should become damaged, they can be easily replaced without replacing the entire enclosure 62.

While a preferred embodiment of the present invention has been described above, certain variations should be considered within the scope of the invention. For example, while spool 34 has been illustrated as a part of driving portion 30 and enclosure 62 as a part of driven portion 32, these functions could be reversed. Also, while spring 74 has been shown to bias enclosure 62 against an upward force on the bottom of enclosure 62, the spring 74 could be eliminated.

In addition, the principles of this invention are also applicable to filament line lawn mowers in which the filament line cutting element is carried by a wheeled chassis and is not located on the end of a hand held handle assembly. In such a mechanism, some of spider 64 analogous to that illustrated in FIGS. 2 and 3 of the present application. For example, assuming that a spider generally identical to spider 64 is used, such a spider could be forced down or up by a yoke assembly vertically moveable in response to remote actuation by the operator of the filament line lawn mower. This movement of the spider would cause arms 70 to flex in the same manner disclosed herein to effect radial movement of the upstanding members 68. Thus, this invention is to be limited only by the scope of the appended claims.

I claim:
1. In a vegetation cutting device in which a free end of a flexible filament is rotatably swung as a cutting length about the axis of a drive shaft, apparatus for metering discrete lengths of filament comprising:
(a) driving means for rotatably driving said filament about an axis, said driving means including at lease one driving member;
(b) driven means having at least one driven member selectively engageable with said driving member for selectively coupling said driven means with said driving means for rotation therewith said driven member being capable of radial and rotational movement with respect to said driving member;
(c) spool means for storing said flexible filament, said spool means being coupled to said driving means for rotation therewith; and
(d) means for metering discrete lengths of filament from said spool means to extend said cutting length by bumping said driven means on the ground, wherein the metering means includes means for moving said driven member radially with respect to the drive shaft axis during the bumping opration until said driven member disengages said driving member to free the driven means for rotation relative to the driving means, whereby said spool means pays out a length of filament during said relative rotation, and wherein said driven member is carried on an arm which is radially bendable in response to bumping said driven means on the ground.

2. An apparatus in accordance with claim 1, wherein said metering means includes stop means for stopping relative rotation of said driving and driving means when said driving and driven members are disengaged.

3. An apparatus in accordance with claim 2, wherein said stop means is rotatively offset with respect to said driving member, and wherein said driven member has a first orientation for engagement with said driving member and a second orientation for engagement with said stop means, said driven member moving from said first orientation to said second orientation and back to said first orientation during a bumping operation, whereby said driving and driven means rotate a discrete amount relative to one another causing said spool means to pay out a length of filament.

4. An apparatus in accordance with claim 1, wherein said driven means includes housing means for substantially enclosing said spool means, said housing means including guide means for supporting and guiding said filament outward from said spool means.

5. In a vegetation cutting device in which a free end of a flexible filament is rotatably swung as a cutting length about the axis of a drive shaft, apparatus for feeding discrete lengths of filament comprising:
(a) a spool attached to said drive shaft having a central core, said spool including a plurality of driving teeth and an equal number of stop members extending downwardly therefrom in a regular pattern, said driving teeth being equiangularly spaced and centered on a first circle about the drive shaft axis, said driving teeth having an abutment surface facing in the rotational direction of said drive shaft, said stop members being equiangularly spaced and centered on a second circle about the drive shaft axis, the second circle having a smaller diameter than the first circle, said stop members being rotationally offset from said teeth, said stop members having an abutment surface facing in the rotational direction of said drive shaft;
(b) a spider having a central core, a plurality of equiangularly spaced upstanding members for engagement with said teeth, and arms for connecting said upstanding members with said central core, said arms being bendable;

(c) a housing enclosure having a bottom with a peripheral wall rising therefrom which enclosure is axially movable relative to the spool, the wall of said enclosure having an opening for guiding said filament outwardly from said spool, the bottom of said enclosure having support means upon which said upstanding members rest so as to support said spider spaced above said bottom, said enclosure having means for preventing said upstanding members from moving rotationally relative thereto;

(d) resilient means located between the bottom of said enclosure and the cental core of said spider for retaining the central core of said spider in contact with the core of said spool; and (e) wherein said support means in said enclosure is configured to bend said arms when a force is applied to the bottom of said enclosure to move said enclosure axially upward with respect to said spool, and wherein said arms are bent sufficiently far such that said upstanding members are moved radially inward with respect to the drive shaft axis thereby disengaging said upstanding members from said teeth allowing said spool and said housing enclosure to rotate relative to one another until said upstanding members engage said stop members, the relative rotation of said spool and said housing enclosure allowing a length of filament to pay out from said spool.

* * * * *